June 30, 1936.  C. E. VALENTINE  2,045,934

LOCKING DEVICE FOR MILK BOTTLES

Filed Aug. 10, 1935  2 Sheets-Sheet 1

Inventor
C. E. Valentine
By John Patten Duffie
Attorney

June 30, 1936.  C. E. VALENTINE  2,045,934
LOCKING DEVICE FOR MILK BOTTLES
Filed Aug. 10, 1935  2 Sheets-Sheet 2

Inventor
C. E. Valentine
By John Patten Duffie
Attorney

Patented June 30, 1936

2,045,934

UNITED STATES PATENT OFFICE 2,045,934

LOCKING DEVICE FOR MILK BOTTLES

Clarence E. Valentine, Lancaster, Ohio

Application August 10, 1935, Serial No. 35,642

1 Claim. (Cl. 232—41)

This invention relates to new and useful improvements in locking devices for milk bottles.

One object of my invention is to provide a simple and economical device of this character which may be fastened to an outside wall of a building at a sufficient elevation to protect the milk against contamination by dogs, cats or other animals.

A further object of my invention is to provide the device with a cover that will protect the milk from rain or unseasonable weather and with suitable locking means whereby the milk bottles may be locked against theft.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1:
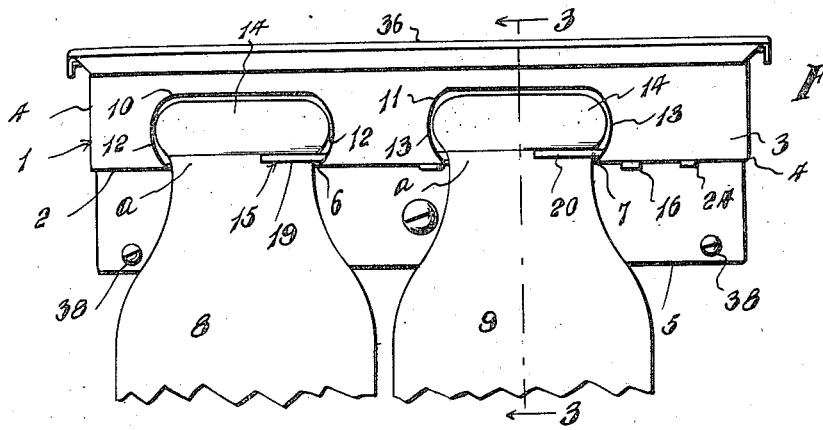
Figure 1 is a front elevation, illustrating the application of my invention.
Figure 2:
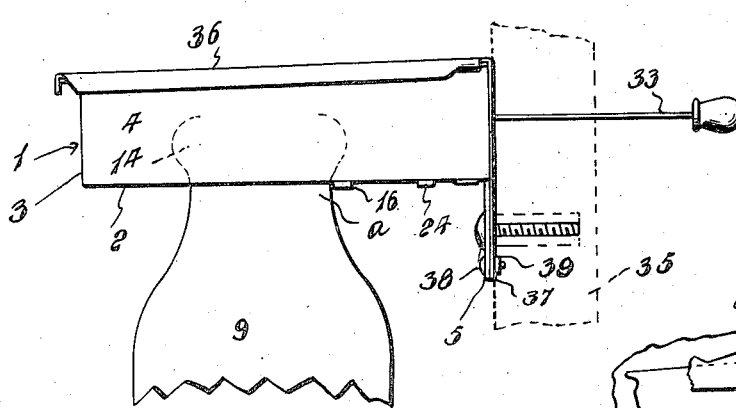
Figure 2 is an end view.
Figure 7:
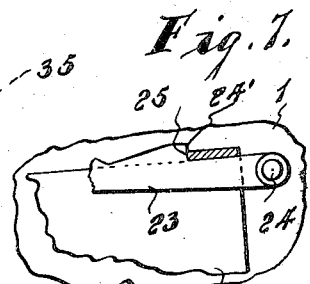
Figure 7 is a detail horizontal section, taken on line 7—7 of Figure 6.
Figure 3:
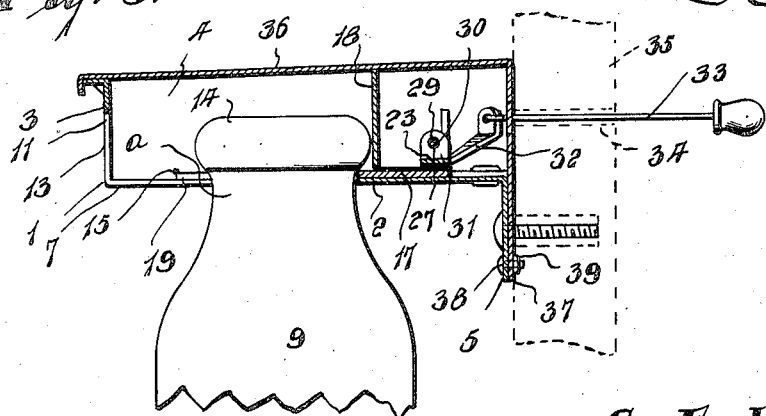
Figure 3 is a vertical transverse section, taken on line 3—3 of Figure 1.

Referring to the drawings for a more particular description of my invention, and in which drawings like parts are designated by like reference characters throughout the several views, my device comprises a rectangular oblong casing 1, consisting of the flat bottom wall 2, front wall 3 and end walls 4. The bottom wall 2 is provided at its rear edge with the straight depending flange 5 and is formed in its front edge with a pair of corresponding longitudinally spaced parallel slots 6 and 7, respectively, adapted to receive the necks a of the milk bottles 8 and 9. The front wall 3 is also formed with the horizontally disposed longitudinal slots 10 and 11 having inwardly curved end walls 12 and 13, to receive the rims 14 of the bottles. By virtue of this construction, the milk bottles may be readily inserted in place and will not fall out when released by the locking element, as will more fully hereinafter appear.

Figure 4:
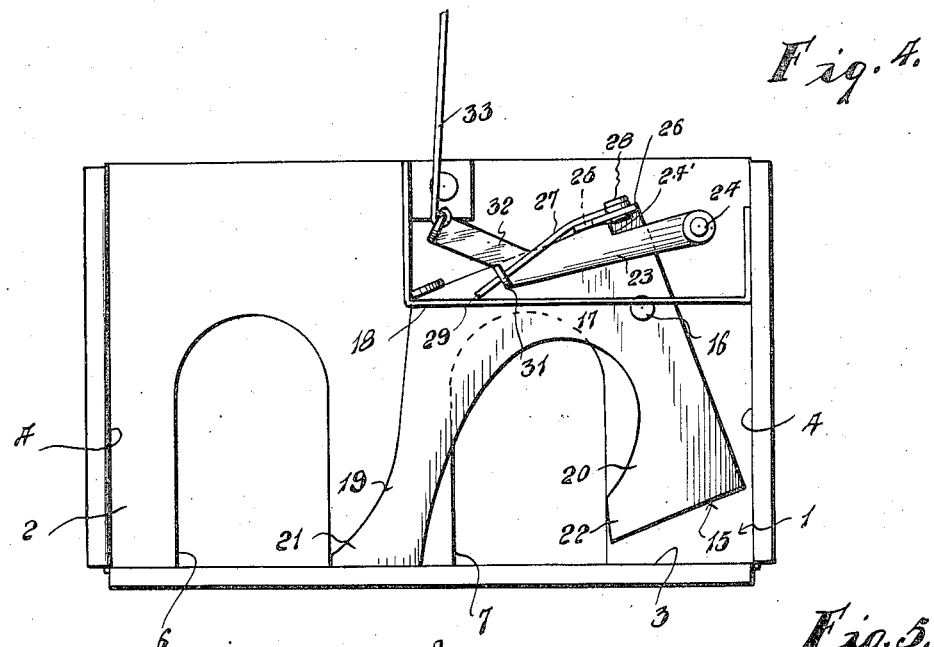
Figure 4 is a plan view with the cover removed, and the locking member in retracted or inoperative position.
Figure 5:
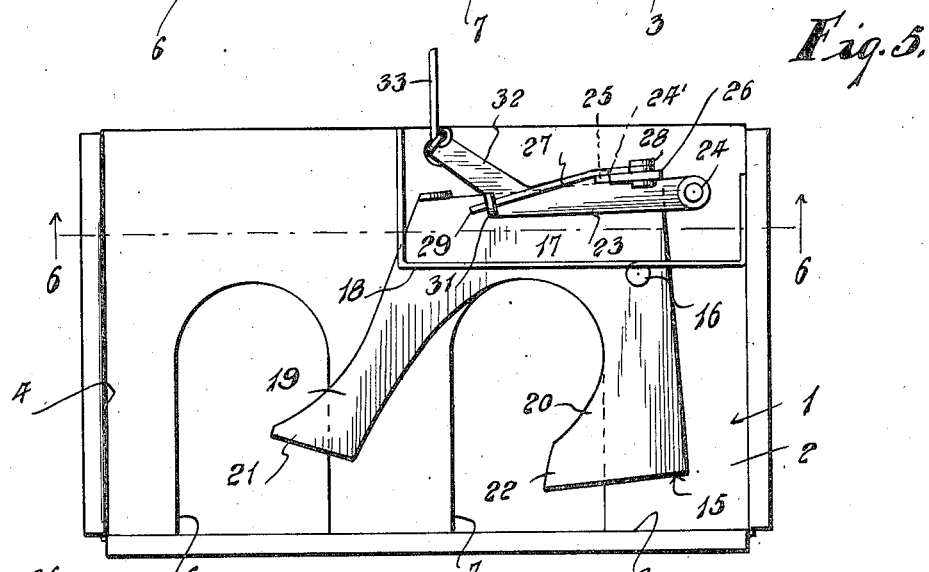
Figure 5 is a similar view, with the locking member in operative or bottle engaging position.
Figure 6:
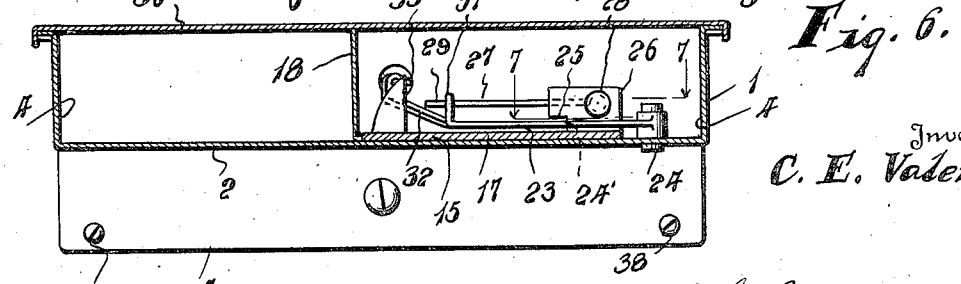
Figure 6 is a horizontal section, taken on line 6—6 of Figure 5

The bottle locking member 15 is of flat substantially U-shape form, and is pivoted at one corner, as at 16, to the upper face of the bottom wall 2 of the casing 1. The locking member 15 comprises the central body portion 17, which works under the guard 18 and the longer and shorter leg portions 19 and 20, respectively. When the locking member is operative or bottle engaging position, the lugs or extensions 21 and 22 at the outer ends of the leg portions 19 and 20 extend partially across the slots 6 and 7 and engage the necks a of the milk bottles at the front, and when the locking element is released, the leg portions aforesaid assume the position illustrated in Figure 4 of the drawings, thus permitting the removal of the bottles.

The locking member is normally held in operative position by the latch 23, pivoted at one end, as at 24, to the bottom wall 2 of the casing and formed with a shoulder or catch 24′ adapted to engage the recessed edge 25 of the upright lug or ear 26. A wire spring 27 is fastened at one end, as at 28, to the lug or ear 26 aforesaid, and is arranged with its free end 29 working through a corresponding opening 30 in the lug 31 situated at the free end of the latch. The free end of the latch is also provided with a tongue 32, provided with a handle or wire 33, which extends through a small opening 34 in the wall 35 of the house, within convenient reach of the occupant.

A flat cover 36 fits over the casing 1 and is provided at its rear edge with a depending flange 37, which forms the rear wall of the casing and which overlaps the flange 5 of the bottom wall 2. The flanges 37 and 5 are fastened together by the bolts and nuts 38 and 39, respectively, or other equivalent fastening means.

In practice, the necks of the full milk bottles are inserted in the slots 6 and 7 by the driver and a slight pressure exerted against the edge of the locking member by the last bottle delivered to move the locking member into bottle engaging position. The shoulder or catch 24′ will then engage the recessed edge 25 of the lug or ear 26 and the only way in which the locking member may be released is by the occupant from the inside. If only one bottle is to be delivered, it is inserted in slot 7. If two bottles are to be delivered, the first bottle is inserted in slot 6 and the second in slot 7, before the locking member is actuated in the manner heretofore described.

The tops of the bottles fit snugly against the bottom face of the cover and for this reason, no straw or tubing may be inserted to drain or syphon out the milk.

From the foregoing description taken in connection with the drawings, it is thought that the construction, operation and advantages of my invention will be readily understood, without requiring a more extended explanation.

Having described my invention, what I claim as new and desire to secure by Letters Patent, is:

In a locking device for milk bottles, a rectangular oblong casing formed in its bottom wall with a pair of corresponding longitudinally spaced parallel slots adapted to receive the necks of the milk bottles, a substantially U-shaped locking element pivoted adjacent one corner to the bottom wall of the casing, lugs or extensions formed at the outer ends of the leg portions of the locking element and adapted to extend partially across said slots, and engage the bottle necks at the front when said locking element is in operative or bottle engaging position, a spring controlled latch for holding the locking element in operative or bottle engaging position and a handle connected with the free end of the latch for releasing the locking element from the inside of the building.

CLARENCE E. VALENTINE.